US012701329B2

(12) United States Patent
Lee

(10) Patent No.: US 12,701,329 B2
(45) Date of Patent: Aug. 4, 2026

(54) ELECTRONIC DEVICE FOR CAPTURING HIGH DYNAMIC RANGE IMAGES, AND OPERATING METHOD THEREOF

(71) Applicant: SAMSUNG ELECTRONICS CO., LTD., Suwon-si (KR)

(72) Inventor: Seungyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 18/654,851

(22) Filed: May 3, 2024

(65) Prior Publication Data

US 2024/0292110 A1 Aug. 29, 2024

Related U.S. Application Data

(63) Continuation of application No. PCT/KR2022/016051, filed on Oct. 20, 2022.

(30) Foreign Application Priority Data

Nov. 4, 2021 (KR) ........................ 10-2021-0150805

(51) Int. Cl.
*H04N 23/741* (2023.01)
*G06T 5/50* (2006.01)
(Continued)

(52) U.S. Cl.
CPC ............. *H04N 23/741* (2023.01); *G06T 5/50* (2013.01); *H04N 23/632* (2023.01); *H04N 23/73* (2023.01); *G06T 2207/20208* (2013.01)

(58) Field of Classification Search
None
See application file for complete search history.

(56) References Cited

U.S. PATENT DOCUMENTS

| | | | |
|---|---|---|---|
| 10,419,684 | B2 | 9/2019 | Kweon et al. |
| 2008/0055683 | A1 | 3/2008 | Choe et al. |

(Continued)

FOREIGN PATENT DOCUMENTS

| | | |
|---|---|---|
| JP | 2013-162190 A | 8/2013 |
| KR | 10-2008-0022399 A | 3/2008 |

(Continued)

OTHER PUBLICATIONS

International Search Report (PCT/ISA/210) dated Jan. 31, 2023, issued by the International Searching Authority in International Application No. PCT/KR2022/016051.

(Continued)

*Primary Examiner* — James M Hannett
(74) *Attorney, Agent, or Firm* — Sughrue Mion, PLLC

(57) ABSTRACT

Disclosed is an electronic device including a camera apparatus, a display, at least one processor, and memory storing instructions, that, when executed by the at least one processor, cause the electronic device to obtain, through the camera apparatus, a first image and at least one image in which a parameter for a high dynamic range (HDR) is changed with respect to the first image, obtain a first HDR image using the first image and the at least one image, display, on the display, a first preview image corresponding to the first image and a second preview image corresponding to the first HDR image, display a user interface for changing the parameter for the first HDR image, and in response to a user input to the user interface, display the second preview image in which the first HDR image is changed to a second HDR image based on the changed parameter.

15 Claims, 15 Drawing Sheets

(51) Int. Cl.
    *H04N 23/63*      (2023.01)
    *H04N 23/73*      (2023.01)

(56)           References Cited

U.S. PATENT DOCUMENTS

| 2013/0250136 | A1 |   | 9/2013 | Chen et al. |  |
|---|---|---|---|---|---|
| 2014/0022408 | A1 |   | 1/2014 | Nashizawa |  |
| 2014/0232904 | A1 | * | 8/2014 | Na | H04N 1/387 |
|  |  |  |  |  | 348/239 |
| 2015/0124147 | A1 | * | 5/2015 | Lee | H04N 21/4316 |
|  |  |  |  |  | 348/333.11 |
| 2017/0070666 | A1 |   | 3/2017 | Kim |  |
| 2023/0209179 | A1 |   | 6/2023 | Manzari et al. |  |

FOREIGN PATENT DOCUMENTS

| KR |   10-2014-0104806 | A | 8/2014 |
|---|---|---|---|
| KR |   10-2015-0051085 | A | 5/2015 |
| KR |      10-1679279 | B1 | 11/2016 |
| KR |   10-2017-0030347 | A | 3/2017 |
| KR |      10-2022444 | B1 | 9/2019 |

OTHER PUBLICATIONS

Written Opinion (PCT/ISA/237) dated Jan. 31, 2023, issued by the International Searching Authority in International Application No. PCT/KR2022/016051.
Communication issued Oct. 23, 2025 by the Korean Intellectual Property Office in Korean Patent Application No. 10-2021-0150805.

* cited by examiner

1

ELECTRONIC DEVICE FOR CAPTURING HIGH DYNAMIC RANGE IMAGES, AND OPERATING METHOD THEREOF

CROSS-REFERENCE TO RELATED APPLICATIONS

This application is a bypass continuation application of International Application No. PCT/KR2022/016051, filed on Oct. 20, 2022, which is based on and claims priority to Korean Patent Application No. 10-2021-0150805, filed on Nov. 4, 2021, in the Korean Patent Office, the disclosures of which are incorporated by reference herein in their entireties.

BACKGROUND

1. Field

The disclosure relates to an electronic device for capturing high dynamic range (HDR) images and a method for operating the same.

2. Description of Related Art

Recently released electronic devices, such as smartphones, come equipped with cameras to capture high-definition images. Further, electronic devices, such as smartphones, may perform an HDR function to output high-quality images through equipped cameras.

Dynamic range of image may refer to a range in which luminance may be represented from a dark portion of an image to a bright portion. A dynamic range adjusting process is performed by adjusting the pixel value indicating brightness, e.g., the brightness of the image. Methods for implementing high dynamic range (HDR), which recently gain popularity, may be broadly classified into three types.

The first type may be techniques that enhance the dynamic range and image quality using an algorithm in image signal processing of image data output from an image sensor. Representative techniques may include gamma-correction or retinex image enhancement.

The second type may be techniques that enhance dynamic range by obtaining two or more images with different exposure amounts and synthesizing the images. As a method of obtaining images, image data is obtained by capturing two photos at different shutter speeds. The images may be synthesized and corrected by applying an appropriate image signal processing algorithm.

The third type may be techniques that dispose pixels with difference sensitivities in one pixel in an image sensor and obtain two pieces of image data. The pixel data generated from the pixels with different sensitivities at the same exposure time may have the same effect as the image data generated at different exposures, and a high dynamic range image may be obtained by synthesizing and correcting the image data generated by two pixels.

The electronic device may not provide a preview for an HDR image upon capturing through a camera, and the user may identify the HDR image after the capture through the camera. Since no preview for the HDR image is provided, the HDR image captured by the electronic device may not meet the user's needs.

SUMMARY

One or more embodiments may provide an electronic device and an operation method thereof, which may provide a user interface that may display a preview screen of an HDR image together on a preview screen displaying an image captured through a camera and may change, in real-time, the exposure value of the HDR image.

According to an aspect of the disclosure, there is provided an electronic device, including: a camera apparatus; a display; at least one processor; and memory storing instructions, that, when executed by the at least one processor, cause the electronic device to: obtain, through the camera apparatus, a first image and at least one image in which a parameter for a high dynamic range (HDR) is changed with respect to the first image; obtain a first HDR image using the first image and the at least one image; display, on the display, a first preview image corresponding to the first image and a second preview image corresponding to the first HDR image; display, on the display, a user interface for changing the parameter for the first HDR image; and in response to a user input to the user interface, display the second preview image in which the first HDR image is changed to a second HDR image based on the changed parameter.

The instructions, when executed by the at least one processor, may cause the electronic device to display the first preview image and the second preview image overlapping.

The instructions, when executed by the at least one processor, may cause the electronic device to display the second preview image in a smaller size than the first preview image.

The instructions, when executed by the at least one processor, may cause the electronic device to: obtain an image corresponding to the first image through a first camera included in the camera apparatus; and obtain the first image and the at least one image through a second camera included in the camera apparatus.

The instructions, when executed by the at least one processor, may cause the electronic device to: obtain the image corresponding to the first image in a first time period through the first camera; and obtain the first image in the first time period and the at least one image in a second time period different from the first time period, through the second camera.

The instructions, when executed by the at least one processor, may cause the electronic device to obtain the first image in a first time period and the at least one image in a second time period different from the first time period, through any camera included in the camera apparatus.

The instructions, when executed by the at least one processor, may cause the electronic device to: resize the first image and the at least one image obtained through the any camera; and obtain the first HDR image using the resized first image and the resized at least one image.

The instructions, when executed by the at least one processor, may cause the electronic device to obtain the first HDR image using at least two of the first image, a second image in which an exposure degree is increased by a first exposure value with respect to the first image, and a third image in which the exposure degree is decreased by the first exposure value with respect to the first image.

The instructions, when executed by the at least one processor, may cause the electronic device to, based on the exposure degree being changed into a second exposure value in response to the user input, obtain the second HDR image using at least two of the first image, a fourth image in which the exposure degree is increased by the second exposure value with respect to the first image, and a fifth image in which the exposure degree is decreased by the second exposure value with respect to the first image.

The instructions, when executed by the at least one processor, may cause the electronic device to capture an image based on the second preview image through the camera apparatus, based on a user input requesting to capture an HDR image.

According to an aspect of the disclosure, there is provided a method for operating an electronic device, the method including: obtaining, through a camera apparatus included in the electronic device, a first image and at least one image in which a parameter for a high dynamic range (HDR) is changed with respect to the first image; obtaining a first HDR image using the first image and the at least one image; displaying, on a display included in the electronic device, a first preview image corresponding to the first image and a second preview image corresponding to the first HDR image; displaying, on the display, a user interface for changing the parameter for the first HDR image; and in response to a user input to the user interface, displaying the second preview image in which the first HDR image is changed to a second HDR image based on the changed parameter.

The displaying the first preview image and the second preview image may include displaying the first preview image and the second preview image overlapping.

The displaying the first preview image and the second preview image may include displaying the second preview image in a smaller size than the first preview image.

The obtaining the first image and the at least one image may include: obtaining an image corresponding to the first image through a first camera included in the camera apparatus; and obtaining the first image and the at least one image through a second camera included in the camera apparatus.

The obtaining the first image and the at least one image may include: obtaining the image corresponding to the first image in a first time period through the first camera; and obtaining the first image in the first time period and the at least one image in a second time period different from the first time period, through the second camera.

The electronic device according to one or more embodiments may display HDR images with different brightness through a preview image in advance depending on a change in exposure value. Further, the electronic device according to various embodiments may change, in real-time, the exposure value of a preview image including an HDR image according to a user input to a user interface and may thus identify and capture an HDR image reflecting the user's desired exposure degree.

DETAILED DESCRIPTION

Figure 1:
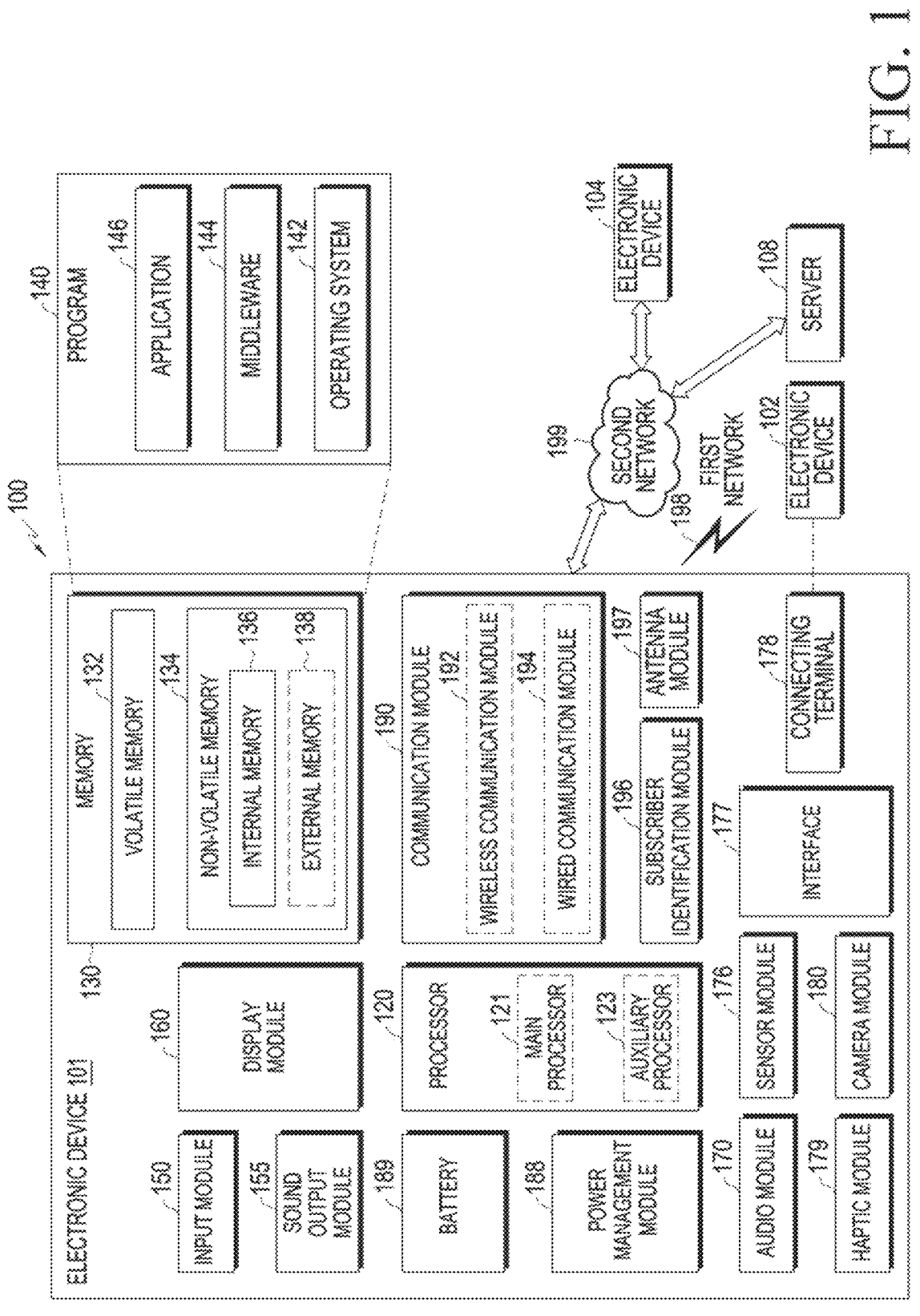
FIG. 1 is a view illustrating an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
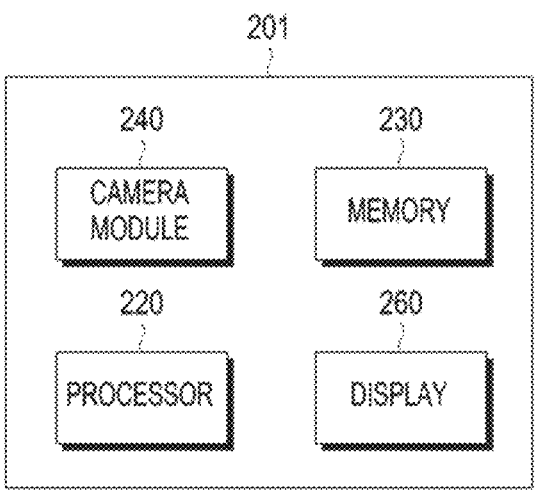
FIG. 2 is a schematic block diagram illustrating an electronic device according to one or more embodiments.

FIG. 2 is a schematic block diagram illustrating an electronic device according to various embodiments.

Referring to FIG. 2, an electronic device 201 may include a processor 220, a memory 230, a camera module 240, and a display 260. For example, the electronic device 201 may be implemented to be identical or similar to the electronic device 101 of FIG. 1. For example, the electronic device 201 may be implemented as a smartphone.

According to various embodiments, the processor 220 may obtain (or capture) an image through the camera module 240. The processor 220 may obtain two or more images having different parameters (e.g., exposure values) through the camera module 240, and may obtain (or generate) a high dynamic range (HDR) image using the obtained two or more images. For example, the parameter (or the parameter for HDR) may include various parameters (e.g., exposure value, white balance, shutter speed, ISO sensitivity) for generating a video or an image (e.g., HDR image). For example, among various parameters, exposure value is described below for convenience of description, but the technical features of the disclosure are not limited thereto.

According to various embodiments, the processor 220 may sequentially obtain a first image and at least one image whose exposure value (e.g., the value indicating the amount of exposure determined by a combination of the camera aperture and the camera speed) has been changed with respect to the first image. For example, the first image may be an image captured at a default exposure value (e.g., an exposure value of 0) set in the camera module 240. In other words, the first image may be an image captured without changing the default exposure value set in the camera module 240. For example, the processor 220 may sequentially obtain the first image, a second image in which the degree of exposure is increased by the first exposure value with respect to the first image, and/or a third image in which the degree of exposure is decreased by the first exposure value with respect to the first image.

According to various embodiments, the processor 220 may obtain an HDR image using the first image and at least one image obtained by changing the exposure value with respect to the first image. For example, the processor 220 may obtain the first HDR image using at least two of the first image, a second image whose exposure degree is increased by a first exposure value with respect to the first image, and a third image whose exposure degree is decreased by the first exposure value with respect to the first image.

According to various embodiments, the processor 220 may display a first preview image corresponding to the first image and a second preview image corresponding to the HDR image together on the display 260 (e.g., the display module of FIG. 1). The processor 220 may display the first preview image and the second preview image with the second preview image overlapping the first preview image. For example, the processor 220 may display the second preview image in a smaller size than the first preview image. For example, the processor 220 may display the first preview image and the second preview image in a picture in picture (PIP) manner.

According to various embodiments, the processor 220 may display a user interface for changing the exposure value for the HDR image while displaying the first preview image and the second preview image on the display 260. When the exposure value is changed based on a user input to the user interface, the processor 220 may display the second preview image corresponding to the HDR image based on the changed exposure value. For example, if the exposure value is changed to the second exposure value by a user input to the user interface, the processor 220 may sequentially obtain the first image, a second image in which the degree of exposure is increased by the second exposure value with respect to the first image, and/or a third image in which the degree of exposure is decreased by the second exposure value with respect to the first image. The processor 220 may obtain the first HDR image using at least two of the first image, a second image whose exposure degree is increased by the second exposure value with respect to the first image, and a third image whose exposure degree is decreased by the second exposure value with respect to the first image. The processor 220 may display the second preview image corresponding to the HDR image obtained based on the changed second exposure value. Accordingly, the processor 220 may display the HDR image according to the change of the exposure value through the preview image in advance.

According to an embodiment, the camera module 240 (e.g., the camera module 180 of FIG. 1) may include a plurality of cameras. For example, the camera module 240 may include a plurality of cameras disposed on the rear surface of the electronic device 202. Further, the camera module 240 may further include at least one camera disposed on the front surface of the electronic device 201.

According to various embodiments, the processor 220 may obtain an image corresponding to the first image through the first camera included in the camera module 240. Further, the processor 220 may obtain the first image and at least one image obtained by changing the exposure value with respect to the first image through the second camera different from the first camera included in the camera module 240. For example, the processor 220 may obtain, through the first camera, images corresponding to the first image in a first time period and a second time period (e.g., a time period after the first time period) different from the first time period. The processor 220 may obtain the first image in the first time period and at least one image in the second time period through the second camera. For example, the first camera and the second camera may be two cameras among the plurality of cameras disposed on the rear surface of the electronic device 201.

According to various embodiments, the processor 220 may obtain images corresponding to the first images at a designated frame rate (or a designated frame per second (fps)) through the first camera and display the first frame image based on the obtained images corresponding to the first images. For example, the first frame image may be displayed according to a designated frame rate.

According to various embodiments, the processor 220 may obtain, through the second camera, at least one image in which the exposure value is changed with respect to the first image and the first image at a designated frame rate, and obtain an HDR image based on the obtained first image and at least one image. Further, the second frame image may be displayed based on the HDR image. For example, the second frame image may be displayed at a frame rate (determined according to, e.g., the number of at least one image) lower than the designated frame rate.

According to various embodiments, the processor may obtain the first image in a first time period through any one camera included in the camera module, and may obtain at least one image in which the exposure value is changed with respect to the first image in a second time period (e.g., a time period after the first time period) different from the first time period. For example, any one camera may be any one of at least one camera disposed on the front surface of the electronic device 201. Alternatively, any one camera may be any one of a plurality of cameras disposed on the rear surface of the electronic device 201. The processor may resize (e.g., reduce the size) the first image and the at least one image obtained through any one camera, and obtain an HDR image using the resized first image and at least one image.

According to various embodiments, the processor 220 may obtain, through any one camera, at least one image in which the exposure value is changed with respect to the first image and the first image at a designated frame rate, and obtain an HDR image based on the obtained first image and at least one image. The processor 220 may display a first frame image corresponding to the first image at a frame rate lower than the designated frame rate. Further, the processor 220 may display a second frame image corresponding to the HDR image at a frame rate (determined according to, e.g., the number of at least one image) lower than the designated frame rate. In this case, the frame rate of the first frame image and the frame rate of the second frame image may be the same.

According to various embodiments, the processor 220 may capture an image based on the second preview image through the camera module 240, based on a user input for requesting to capture an HDR image. The processor 220 may store the captured HDR image in the memory 230 (e.g., the memory 130 of FIG. 1). Further, the processor 220 may display the captured HDR image on the display 260.

At least some of the operations of the electronic device 201 described below may be performed by the processor 220. In the following description, for convenience of description, it is described that the electronic device 201 performs the operations.

Figure 3:
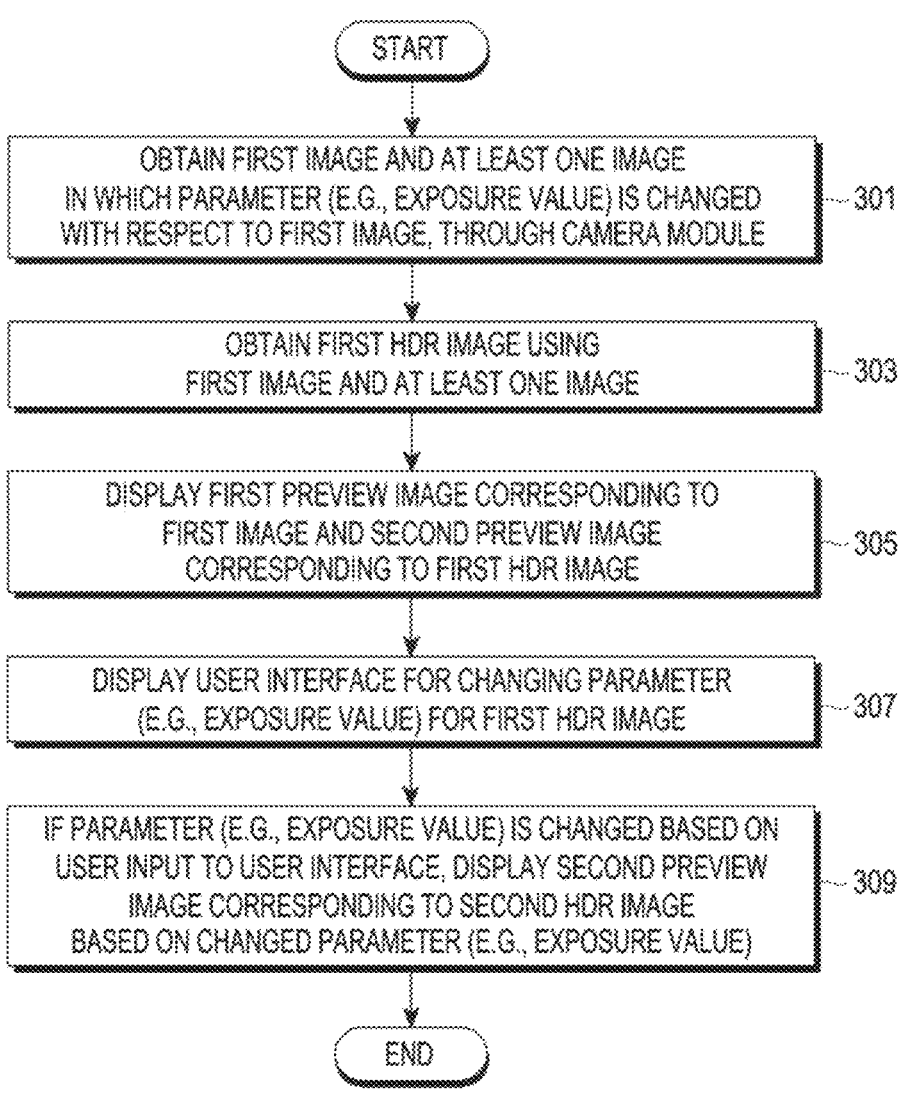
FIG. 3 is a flowchart illustrating an operation method of an electronic device according to one or more embodiments.

FIG. 3 is a flowchart illustrating an operation method of an electronic device according to various embodiments.

Referring to FIG. 3, according to various embodiments, in operation 301, the electronic device 201 may sequentially obtain a first image and at least one image obtained by changing at least one parameter (e.g., exposure value) with respect to the first image through the camera module 240.

According to various embodiments, in operation 303, the electronic device 201 may obtain (or generate) a first HDR image using the first image and at least one image.

According to various embodiments, in operation 305, the electronic device 201 may display a first preview image corresponding to the first image and a second preview image corresponding to the first HDR image together on the display 260. For example, the electronic device 201 may display the first preview image and the second preview image together in a PIP manner.

According to various embodiments, in operation 307, the electronic device 201 may display a user interface for changing at least one parameter (e.g., exposure value) for the first HDR image while displaying the first preview image and the second preview image.

According to various embodiments, in operation 309, when at least one parameter (e.g., exposure value) is changed based on a user input to the user interface, the electronic device 201 may obtain a second HDR image based on the changed at least one parameter (e.g., exposure value) and display a second preview image corresponding to the second HDR image. In this case, while displaying the first preview image and the second preview image together, the electronic device 201 may change (or update) only the second preview image according to a change in at least one parameter (e.g., exposure value).

Figure 4:
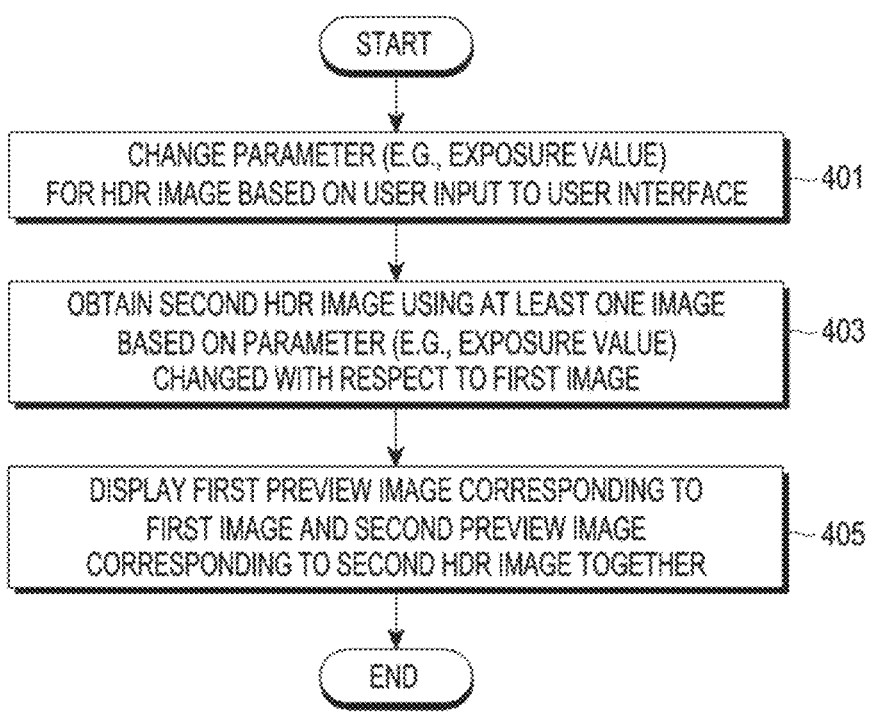
FIG. 4 is a flowchart illustrating a method in which an electronic device displays a preview image in which a parameter (e.g., exposure value) has been changed, according to one or more embodiments.

FIG. 4 is a flowchart illustrating a method in which an electronic device displays a preview image in which a parameter (e.g., exposure value) has been changed, according to various embodiments.

Referring to FIG. 4, according to various embodiments, in operation 401, the electronic device 201 may change a parameter (e.g., exposure value) for an HDR image based on a user input to a user interface.

According to various embodiments, in operation 403, the electronic device 201 may obtain at least one image based on the parameter (e.g., exposure value) changed with respect to the first image and obtain a second HDR image using the obtained at least one image.

According to various embodiments, in operation 407, the electronic device 201 may display the first preview image corresponding to the first image and the second preview image corresponding to the second HDR image together.

According to various embodiments, the electronic device 201 may change at least one of parameters (e.g., exposure value, white balance, shutter speed, and ISO sensitivity) for generating an HDR image with respect to the first image. Although the following description focuses primarily on an embodiment of changing the exposure value among various parameters for convenience of description, but the technical features of the disclosure are not limited thereto.

Figure 5A:
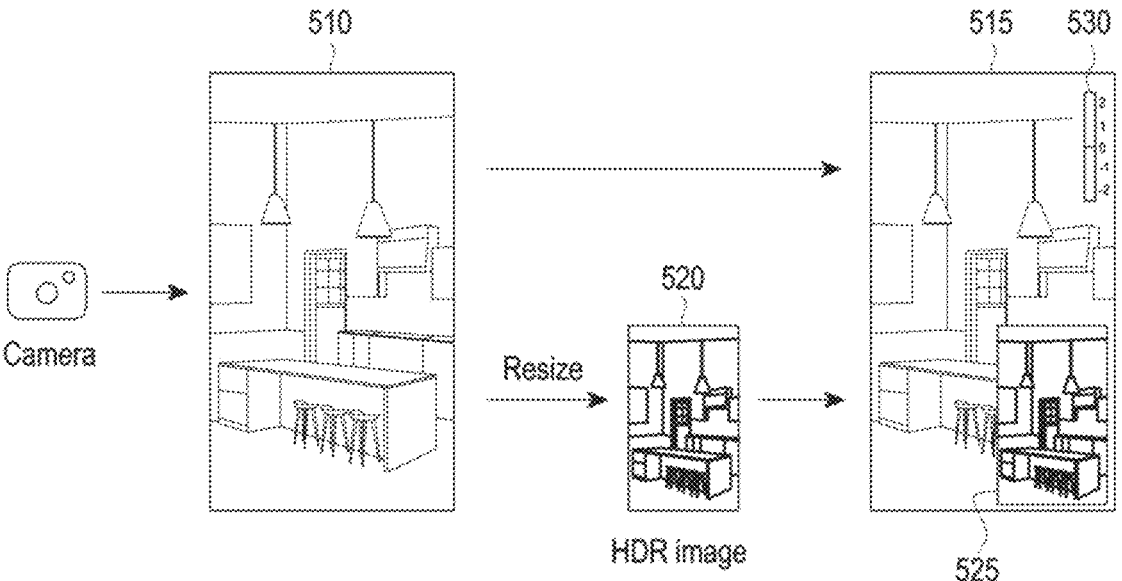
FIGS. 5A and 5B are views illustrating a method in which an electronic device displays a first preview image and a second preview image according to one or more embodiments.
Figure 5B:
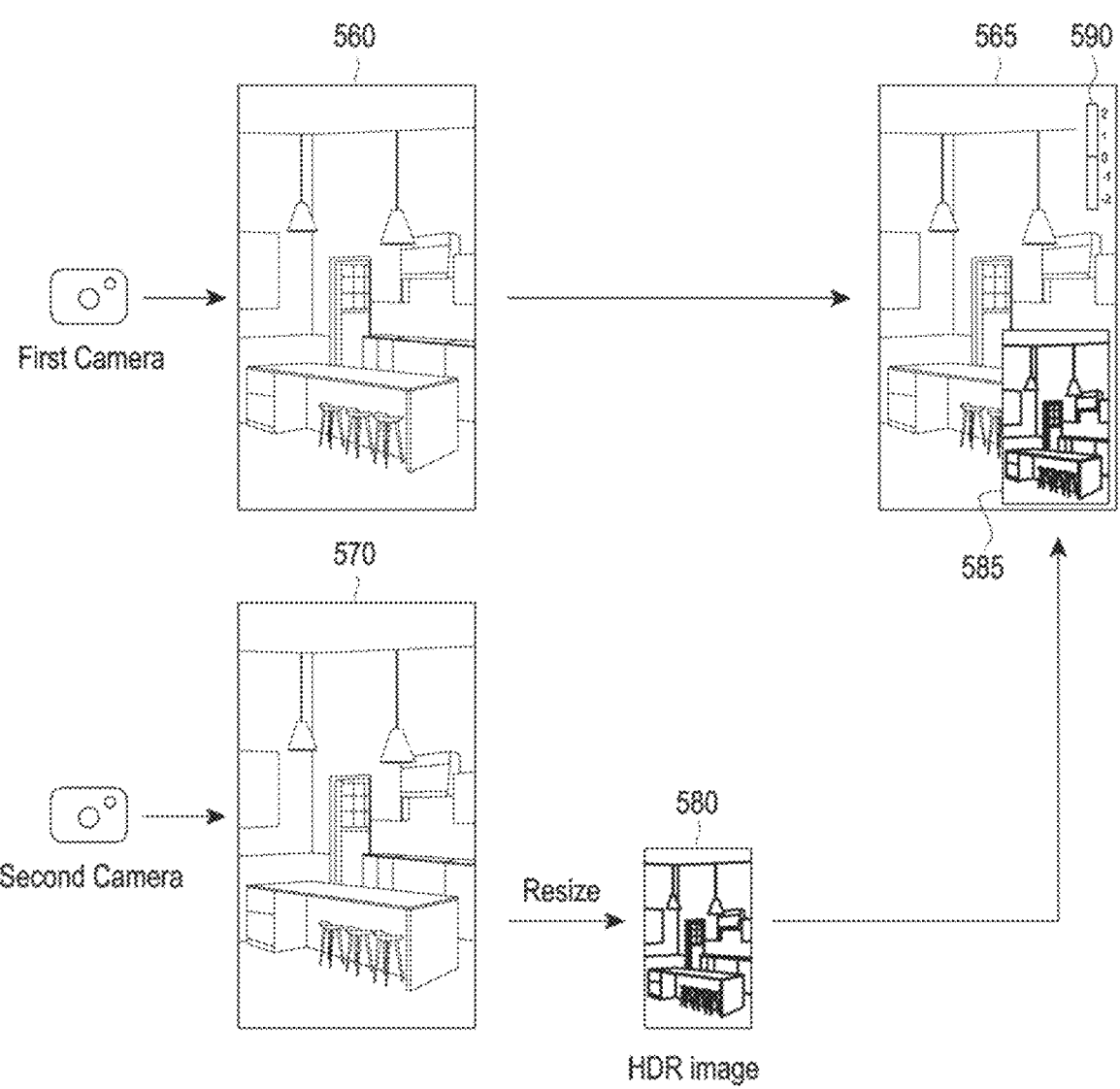

FIGS. 5A and 5B are views illustrating a method in which an electronic device displays a first preview image and a second preview image according to various embodiments.

Referring to FIG. 5A, according to various embodiments, the electronic device 201 may display the first preview image 515 and the second preview image 525 together using any one camera included in the camera module 240.

According to an embodiment, the electronic device 201 may obtain the first image 510 of the default exposure value using any one camera included in the camera module 240. The electronic device 201 may generate the HDR image 520 using the first image 510 obtained using any one camera included in the camera module 240 and at least one image obtained by changing the exposure value with respect to the first image 510. In this case, the electronic device 201 may generate the HDR image 520 by resizing (e.g., reducing the size) the first image 510 and at least one image obtained by changing the exposure value with respect to the first image 510.

According to various embodiments, the electronic device 201 may display a first preview image 515 based on the first image 510 and may display a second preview image 525 based on the HDR image 520. Further, the electronic device 201 may display a user interface 530 for changing the exposure value of the HDR image 520 while displaying the first preview image 515 and the second preview image 525. For example, the user interface 530 may include information about the exposure value of the HDR image 520.

Referring to FIG. 5B, according to various embodiments, the electronic device 201 may display a first preview image 565 and a second preview image 585 together using a plurality of cameras (e.g., a first camera and a second camera) included in the camera module 240.

According to various embodiments, the electronic device 201 may obtain the image 560 of the default exposure value using the first camera included in the camera module 240. Further, the electronic device 201 may obtain the first image 570 of the default exposure value and at least one image obtained by changing the exposure value with respect to the first image using the second camera in the camera module 240. For example, the image 560 may be an image corresponding to the first image 570. For example, the image 560 may be an image obtained by capturing the same subject at the same exposure value as the first image 570 through a first camera different from the second camera. However, the image 560 may have an angle of view different from that of the first image 570, based on the types of the first camera and the second camera (e.g., the type of lens included in the corresponding camera) and the positions where the first camera and the second camera are disposed. The electronic device 201 may generate the HDR image 580 using the first image 570 obtained using the second camera included in the camera module 240 and at least one image obtained by changing the exposure value with respect to the first image 570. In this case, the electronic device 201 may generate the HDR image 580 by resizing (e.g., reducing the size) the first image 570 and at least one image obtained by changing the exposure value with respect to the first image 570.

According to various embodiments, the electronic device 201 may display a first preview image 565 based on the image 560 and may display a second preview image 585 based on the HDR image 580. Further, the electronic device 201 may display a user interface 590 for changing the exposure value of the HDR image 580 while displaying the first preview image 565 and the second preview image 585. For example, the user interface 590 may include information about the exposure value of the HDR image 580.

Figure 6A:
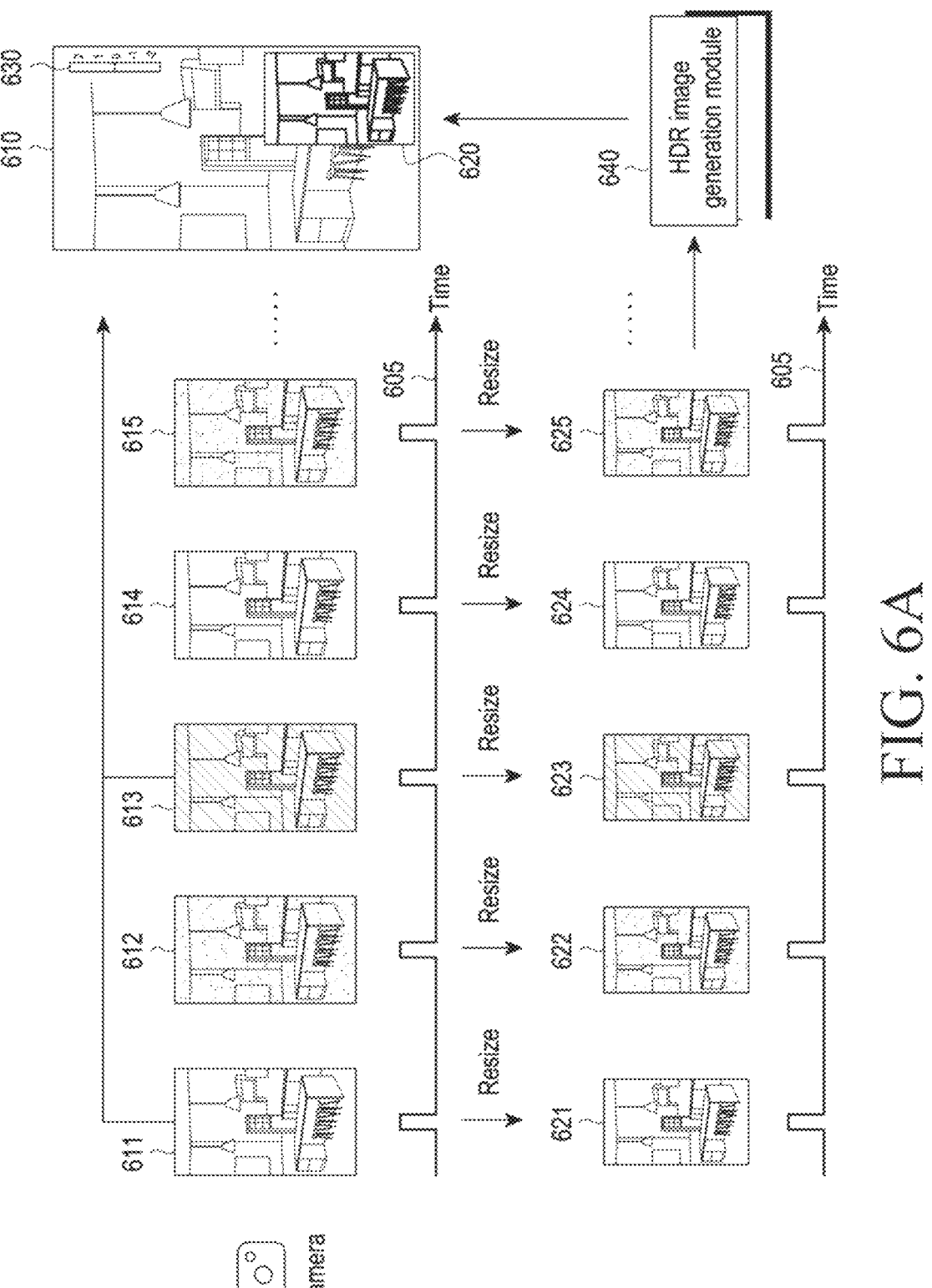
FIGS. 6A and 6B are views illustrating a method in which an electronic device obtains a first preview image and a second preview image according to one or more embodiments.
Figure 6B:
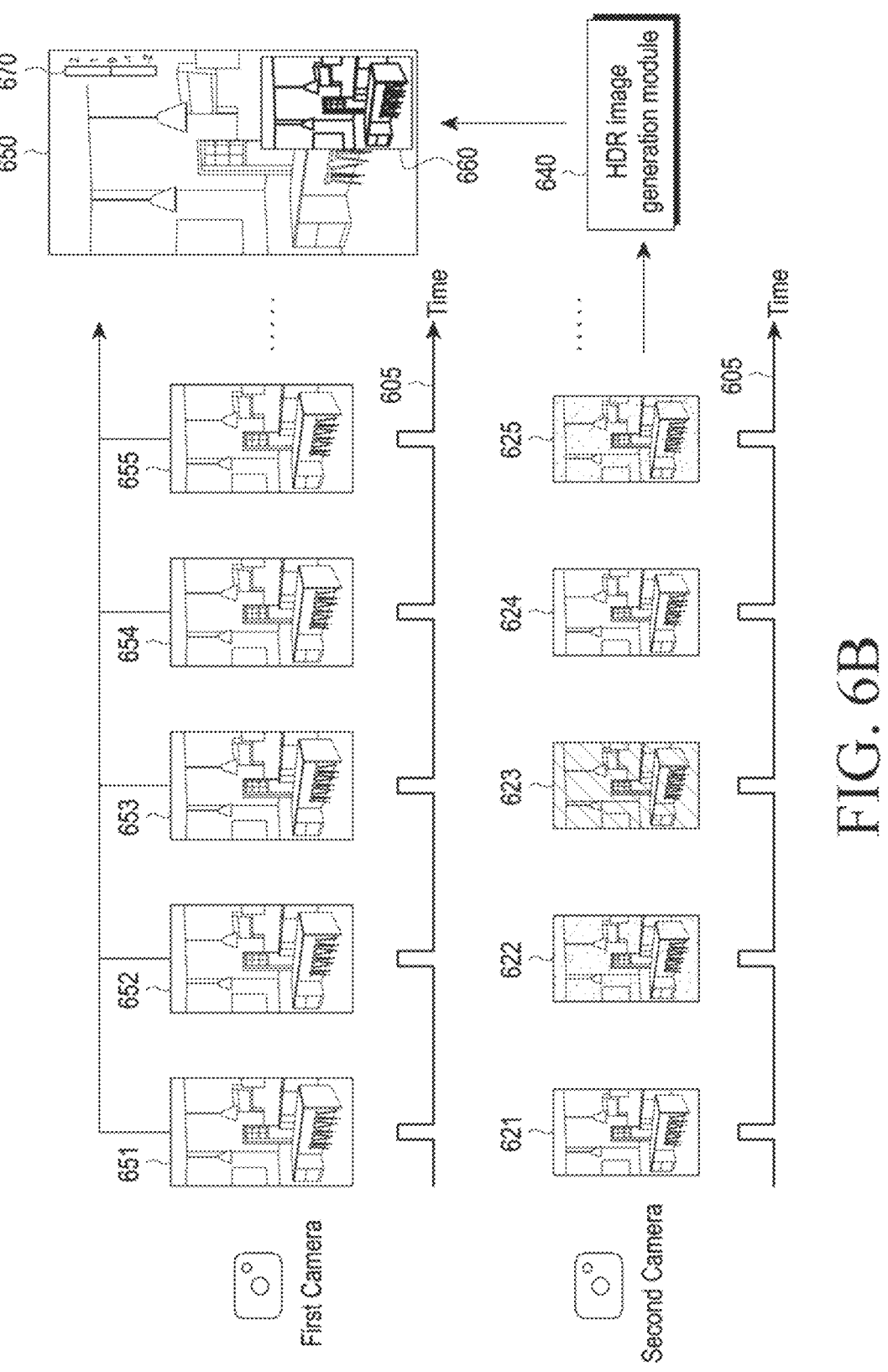

FIGS. 6A and 6B are views illustrating a method in which an electronic device obtains a first preview image and a second preview image according to various embodiments.

Referring to FIGS. 6A and 6B, according to various embodiments, the electronic device 201 may obtain images according to a video signal 605 corresponding to a designated frame rate, from the camera module 240.

Referring to FIG. 6A, according to various embodiments, the electronic device 201 may display the first preview image 610 and the second preview image 620 together using any one camera included in the camera module 240. Further, the electronic device 201 may display a user interface 630 for changing the exposure value of the HDR image while displaying the first preview image 610 and the second preview image 620.

According to various embodiments, the electronic device 201 may obtain, from one camera, a first image 611 having a default exposure value in a first time period. The electronic device 201 may obtain a second image 612 in which the degree of exposure is increased by the first exposure value with respect to the first image 611 in a second time period. The electronic device 201 may obtain a third image 613 in which the degree of exposure is decreased by the first exposure value with respect to the first image 611 in a third time period. The electronic device 201 may obtain a fourth image 614 having the default exposure value in a fourth time period, and may sequentially obtain a fifth image 615 in which the degree of exposure is increased by the first exposure value with respect to the fourth image 614 and a sixth image in which exposure information is decreased by the first exposure value in subsequent time periods. Thereafter, the electronic device 201 may alternately obtain images having different exposure information as described above. For example, the electronic device 201 may display a first preview image 610 with respect to the first image 611 and the fourth image 614. For example, the electronic device 201 may display the first image 611 and the fourth image 614 on the first preview image 610 according to the video signal 605. In this case, the electronic device 201 may continuously display the first image 611 in the second time period and the third time period. For example, the frame rate of the first preview image 610 may be ⅓ of the frame rate of the video signal 605.

According to various embodiments, the electronic device 201 may obtain an image (e.g., 621 to 625) obtained by resizing (e.g., reducing the size (or resolution)) each of the first image 611, the second image 612, the third image 613, the fourth image 614, the fifth image 615, and the sixth image for each time period. For example, the electronic device 201 may generate an HDR image using the resized first image 621, the resized second image 622, and the resized third image 623 through the HDR image generation module 640. For example, the HDR image generation module 640 may generate an HDR image using a designated HDR image generation algorithm. For example, the electronic device 201 may display the second preview image 620 based on the generated HDR image. For example, the frame rate of the second preview image 620 may be ⅔ of the frame rate of the video signal 605.

Referring to FIG. 6B, according to various embodiments, the electronic device 201 may display the first preview image 650 and the second preview image 660 together using the first camera and the second camera included in the camera module 240. Further, the electronic device 201 may display a user interface 670 for changing the exposure value of the HDR image while displaying the first preview image 650 and the second preview image 660.

According to various embodiments, the electronic device 201 may obtain images 651 to 655 having a default exposure value from the first camera. For example, the electronic device 201 may obtain, from the first camera, images 651 to 655 having the default exposure value from the first time period to the fifth time period. For example, the electronic device 201 may display the first preview image 650 based on the images 651 to 655. For example, the electronic device 201 may sequentially display the images 611 to 655 according to the video signal 605. For example, the frame rate of the first preview image 650 may be the same as the frame rate of the video signal 605.

According to various embodiments, the electronic device 201 may obtain images 661 to 665 having a designated size (e.g., the same size as the resized image of FIG. 6A) from the second camera. The electronic device 201 may obtain, from the second camera, a first image 661 having a default exposure value in a first time period. The electronic device 201 may obtain a second image 662 in which the degree of exposure is increased by the first exposure value with respect to the first image 661 in a second time period. The electronic device 201 may obtain a third image 663 in which the degree of exposure is decreased by the first exposure value with respect to the first image 661 in a third time period. The electronic device 201 may obtain a fourth image 664 having the default exposure value in a fourth time period, and may sequentially obtain a fifth image 665 in which the degree of exposure is increased by the first exposure value with respect to the fourth image 664 and a sixth image in which exposure information is decreased by the first exposure value in subsequent time periods. Thereafter, the electronic device 201 may alternately obtain images having different exposure information as described above.

According to various embodiments, the electronic device 201 may generate an HDR image using the first image 661, the second image 662, and the third image 663 through the HDR image generation module 640. For example, the electronic device 201 may display the second preview image 660 based on the generated HDR image. For example, the frame rate of the first preview image 660 may be ⅔ of the frame rate of the video signal 605.

According to various embodiments, as shown in FIG. 6A, when one camera (or lens) is used, the electronic device 201 may generate an HDR image by resizing an image used in the first preview image for the second preview image. On the other hand, as shown in FIG. 6B, when two cameras (or lenses) are used, the electronic device 201 may separately obtain images for the first preview image and the second preview image.

Figure 7A:
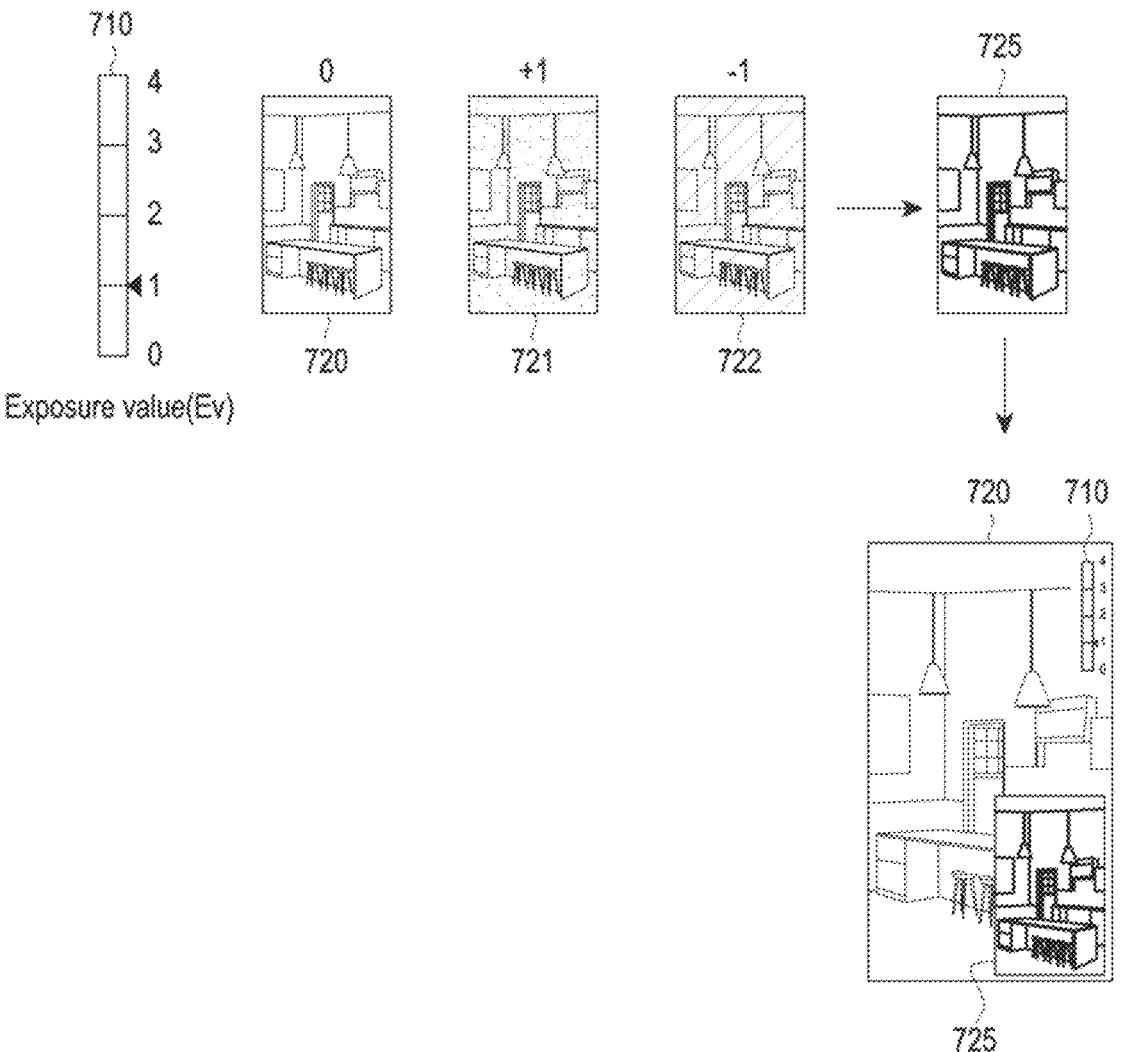
FIGS. 7A and 7B are views illustrating a method in which an electronic device changes an exposure value through a user interface and displays a second preview image corresponding to the changed exposure value, according to one or more embodiments.
Figure 7B:
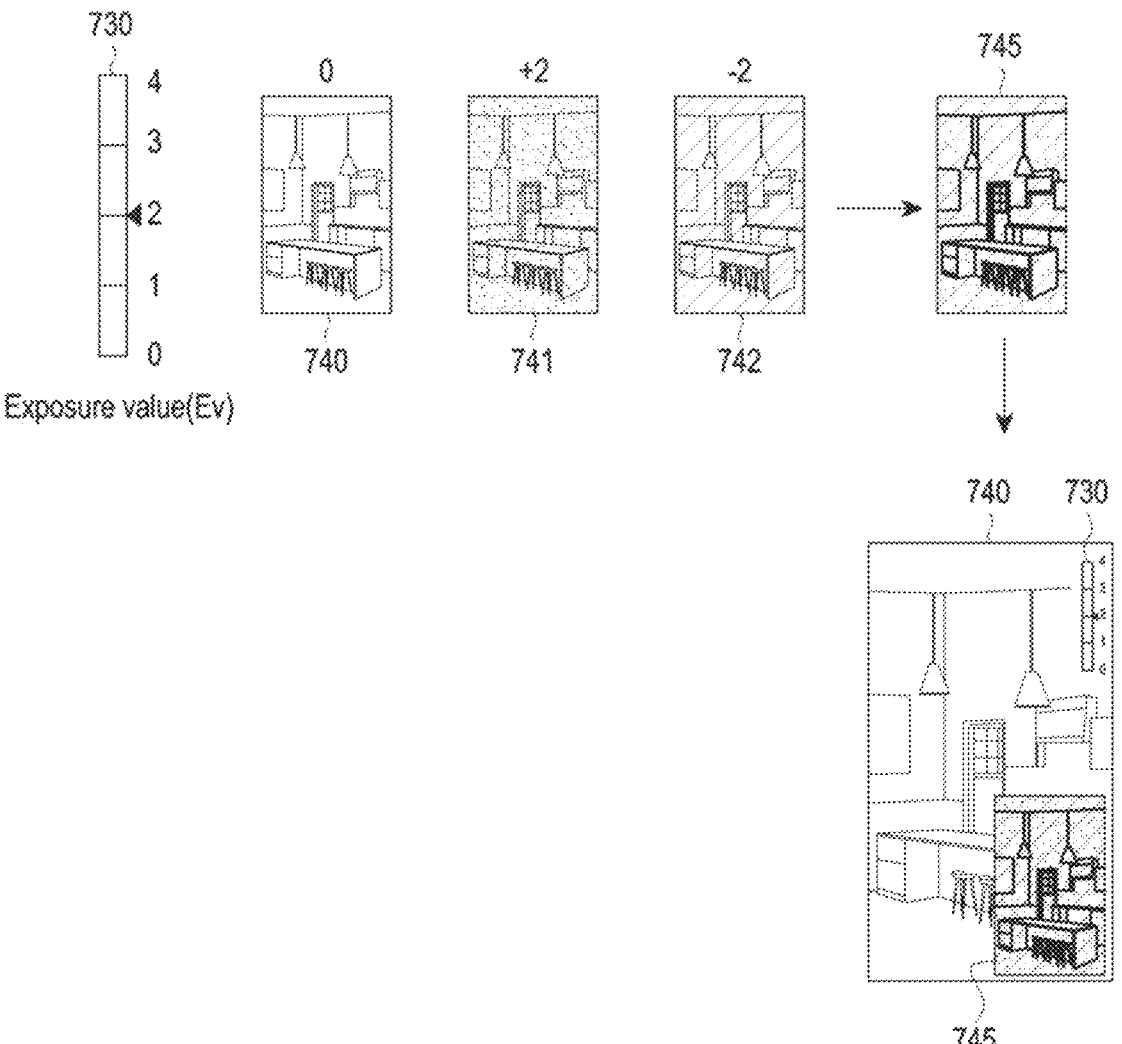

FIGS. 7A and 7B are views illustrating a method in which an electronic device changes an exposure value through a user interface and displays a second preview image corresponding to the changed exposure value, according to various embodiments.

Referring to FIG. 7A, according to various embodiments, an electronic device (e.g., the electronic device 201 of FIG. 2) may display a user interface 710 for changing an exposure value for an HDR image while displaying a first preview image and a second preview image on a display (e.g., the display 260 of FIG. 2). For example, the first preview image may include a first image 720 captured with a default exposure value. For example, the second preview image may include an HDR image 725 obtained using a first image 720, a second image 721 captured with the exposure value increased with respect to the first image 720, and a third image 722 captured with the exposure value decreased with respect to the first image 720.

According to various embodiments, the user interface 710 of the electronic device 201 may include exposure value information about the HDR image 725 displayed in the second preview image. For example, the electronic device 201 may display the HDR image 725 obtained using the second image 721 having an exposure value of "+1" and the third image 722 having an exposure value of "−1" as the second preview image. In this case, the electronic device 201 may include information indicating "1" on the user interface 710.

According to various embodiments, the electronic device 201 may identify a user input to the user interface 710. For example, the user input may include an input for changing the exposure value through the user interface 710 (e.g., a touch input to the user interface 710 or an input to a physical key included in the electronic device 201).

Referring to FIG. 7B, according to various embodiments, when the exposure value is changed based on a user input, the electronic device 201 may display a user interface 730 based on the changed exposure value. In this case, the electronic device 201 may display the first preview image and the second preview image reflecting the changed exposure value. For example, the first preview image may include a first image 740 captured with a default exposure value. For example, the first preview image may include the first image 740 captured at the same exposure value as the first image 720 of FIG. 7A. For example, the second preview image may include an HDR image 745 obtained using a first image 740, a second image 741 captured with the exposure value increased with respect to the first image 740, and a third image 742 captured with the exposure value decreased with respect to the first image 740.

According to various embodiments, the user interface 730 of the electronic device 201 may include exposure value information about the HDR image 745 displayed in the second preview image. For example, the electronic device 201 may display the HDR image 745 obtained using the second image 741 having an exposure value of "+2" and the third image 742 having an exposure value of "−2" as the second preview image. For example, the HDR image 745 having an exposure value of "+2" may be represented at a clearer brightness difference than the HDR image 725 having an exposure value of "+1." In this case, the electronic device 201 may include information indicating "2" on the user interface 730.

Accordingly, the electronic device 201 may display an HDR image having a different brightness according to a change in the exposure value, through the preview image in advance. Further, the electronic device 201 may change the exposure value in real-time according to a user input to the user interface, obtaining or capturing an HDR image reflecting the user's desired degree of exposure through the preview image.

Meanwhile, the range in which the exposure value is changed in FIGS. 7A and 7B is merely an example, and the technical features of the disclosure are not limited thereto. For example, the range in which the exposure value displayed on the user interfaces 710 and 730 is changed may range from −n to +n (e.g., n is a natural number of 1 or more). Further, the unit of the exposure value that may be changed at once by the user interface 710 or 730 may be set to be greater than or less than 1.

Figure 8A:
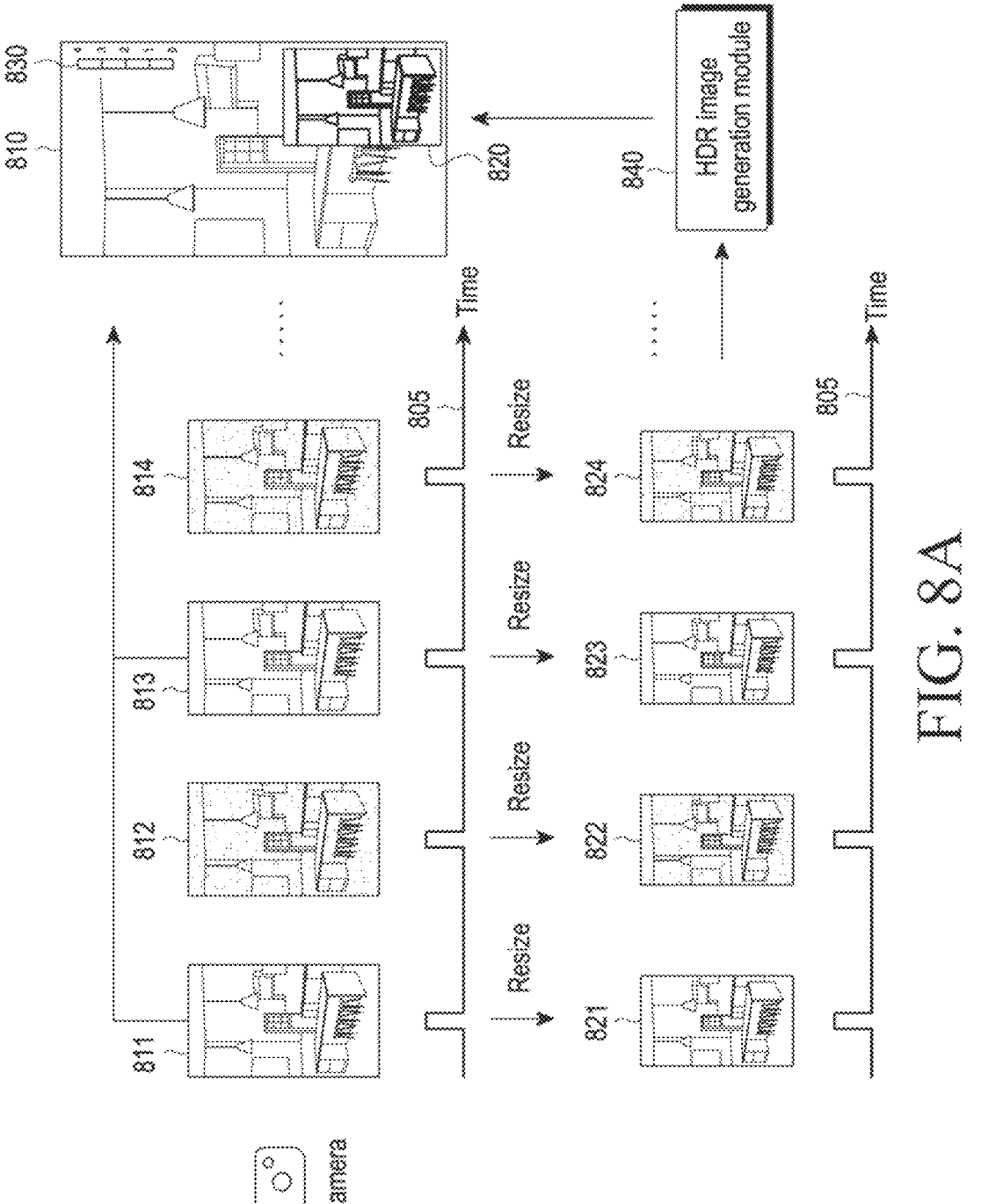
FIGS. 8A and 8B are views illustrating a method in which an electronic device obtains a first preview image and a second preview image according to one or more embodiments.
Figure 8B:
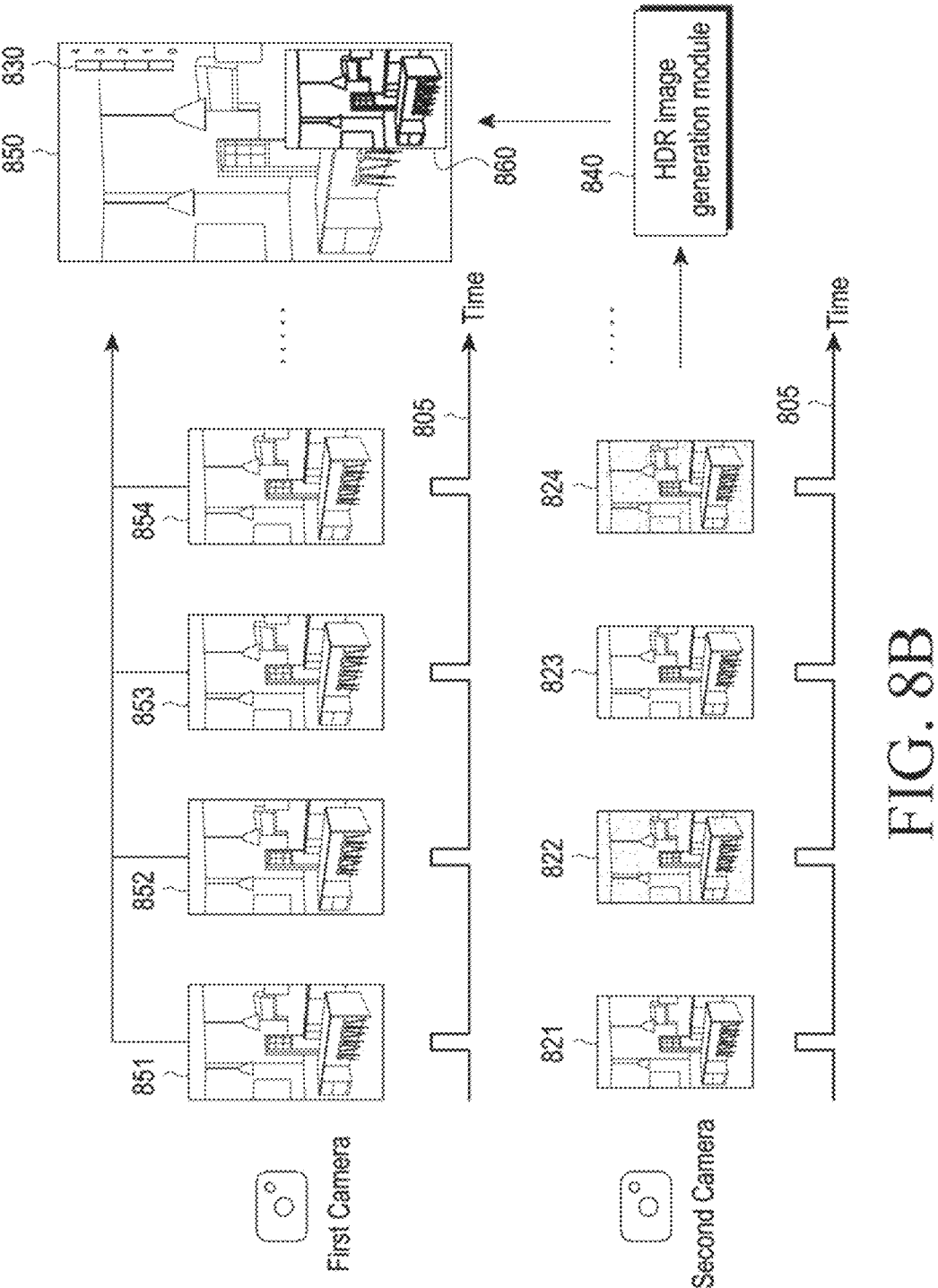

FIGS. 8A and 8B are views illustrating a method in which an electronic device obtains a first preview image and a second preview image according to various embodiments.

Referring to FIG. 8A, according to various embodiments, the electronic device 201 may display the first preview image 810 and the second preview image 820 together using any one camera included in the camera module (e.g., the camera module 240 of FIG. 2). Further, the electronic device 201 may display a user interface 830 for changing the exposure value of the HDR image while displaying the first preview image 810 and the second preview image 820.

According to various embodiments, the electronic device 201 may obtain, from one camera, a first image 811 having a default exposure value in a first time period. The electronic device 201 may obtain the second image 812 in which the degree of exposure is increased or decreased by the first exposure value with respect to the first image 611 in the second time period. The electronic device 201 may obtain a third image 813 having a default exposure value in a third time period. Further, the electronic device 201 may obtain a fourth image 814 in which the degree of exposure is increased or decreased by the first exposure value with respect to the first image 811 in a fourth time period. Thereafter, the electronic device 201 may alternately obtain images having different exposure information as described above. For example, the electronic device 201 may display a first preview image 810 with respect to the first image 811 and the third image 813. For example, the electronic device 201 may display the first image 811 and the third image 813 as the first preview image 810 according to the video signal 805. In this case, the electronic device 201 may display the first image 611 in the first time period and the second time period, and may display the third image 813 in the third time period and the fourth time period. For example, the frame rate of the first preview image 810 may be ½ of the frame rate of the video signal 605.

According to various embodiments, the electronic device 201 may obtain an image (e.g., 821 to 824) obtained by resizing (e.g., reducing the size (or resolution)) each of the first image 811, the second image 812, the third image 813, and the fourth image 814 for each time period. For example, the electronic device 201 may generate a first HDR image using the resized first image 821 and the resized second image 822 through the HDR image generation module 840. Further, the electronic device 201 may generate a second HDR image using the resized third image 823 and the resized fourth image 824 through the HDR image generation module 840. For example, the HDR image generation module 840 may generate an HDR image using a designated HDR image generation algorithm. For example, the electronic device 201 may display the second preview image 820 based on the generated first HDR image and the generated second HDR image. For example, the frame rate of the second preview image 820 may be ⅔ of the frame rate of the video signal 805.

Referring to FIG. 8B, according to various embodiments, the electronic device 201 may display the first preview image 850 and the second preview image 860 together using the first camera and the second camera included in the camera module 240. Further, the electronic device 201 may display a user interface 870 for changing the exposure value of the HDR image while displaying the first preview image 850 and the second preview image 860.

According to various embodiments, the electronic device 201 may obtain images 851 to 854 having a default exposure value from the first camera. For example, the electronic device 201 may obtain, from the first camera, images 851 to 854 having the default exposure value from the first time period to the fourth time period. For example, the electronic device 201 may display the first preview image 850 based on the images 851 to 854. For example, the electronic device 201 may sequentially display the images 851 to 854 according to the video signal 805. For example, the frame rate of the first preview image 850 may be the same as the frame rate of the video signal 805.

According to various embodiments, the electronic device 201 may obtain images 861 to 864 having a designated size (e.g., the same size as the resized image of FIG. 8A) from the second camera. The electronic device 201 may obtain, from the second camera, a first image 861 having a default exposure value in a first time period. The electronic device 201 may obtain the second image 862 in which the degree of exposure is increased or decreased by the first exposure value with respect to the first image 861 in the second time period. The electronic device 201 may obtain a third image 863 having a default exposure value in a third time period. The electronic device 201 may obtain the fourth image 864 in which the degree of exposure is increased or decreased by the first exposure value with respect to the third image 863 in the fourth time period. Thereafter, the electronic device 201 may alternately obtain images having different exposure information as described above.

According to various embodiments, the electronic device 201 may generate a first HDR image using the first image 861 and the second image 862 through the HDR image generation module 840. Further, the electronic device 201 may generate the second HDR image using the third image 863 and the fourth image 864. For example, the second HDR image may be represented with a clearer brightness difference than the first HDR image. For example, the electronic device 201 may display the second preview image 860 based on the generated first HDR image and the generated second HDR image. For example, the frame rate of the second preview image 860 may be ⅔ of the frame rate of the video signal 805.

According to various embodiments, as shown in FIG. 8A, when one camera (or lens) is used, the electronic device 201 may generate an HDR image by resizing an image used in the first preview image for the second preview image. On the other hand, as shown in FIG. 8B, when two cameras (or lenses) are used, the electronic device 201 may separately obtain images for the first preview image and the second preview image.

Figure 9A:
FIGS. 9A and 9B are views illustrating a method in which an electronic device changes an exposure value through a user interface and displays a second preview image corresponding to the changed exposure value, according to one or more embodiments.
Figure 9B:
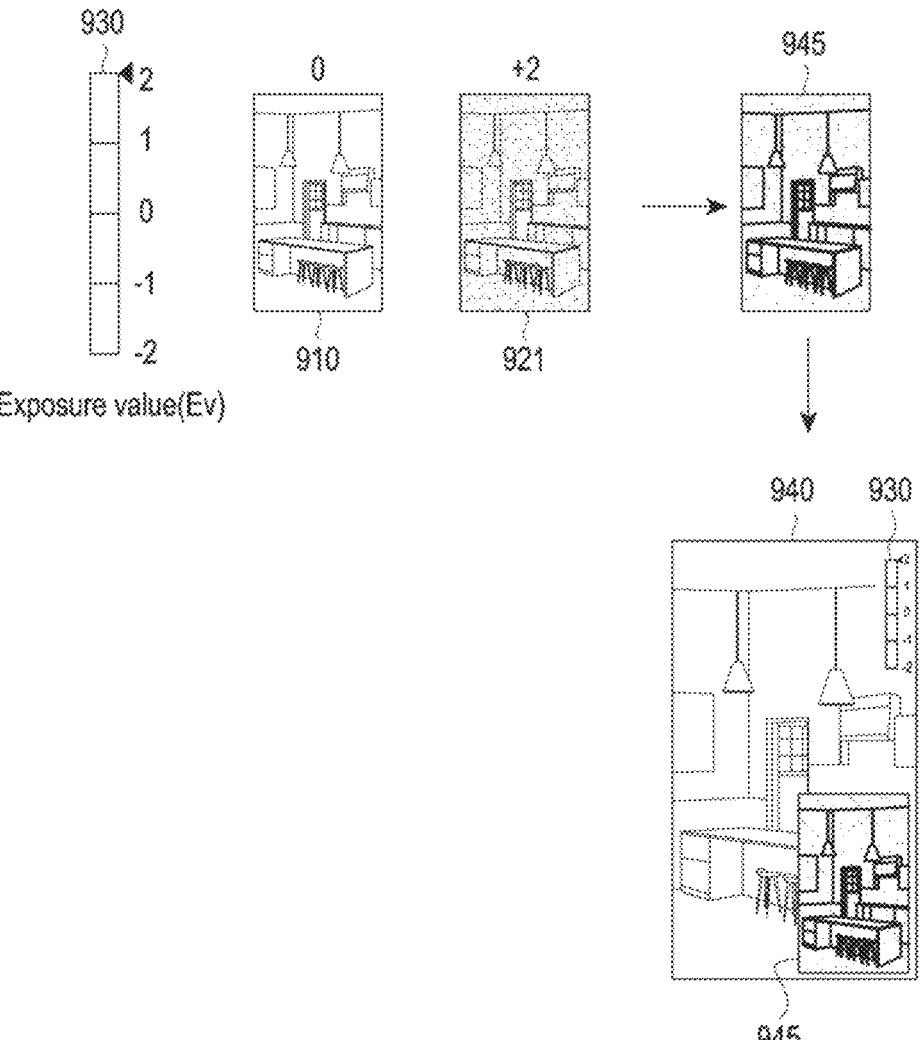

FIGS. 9A and 9B are views illustrating a method in which an electronic device changes an exposure value through a user interface and displays a second preview image corresponding to the changed exposure value, according to various embodiments.

Referring to FIG. 9A, according to various embodiments, an electronic device (e.g., the electronic device 201 of FIG. 2) may display a user interface 910 for changing an exposure value for an HDR image while displaying a first preview image and a second preview image on a display (e.g., the display 260 of FIG. 2). For example, the first preview image may include a first image 920 captured with a default exposure value. For example, the second preview image may include an HDR image 925 obtained using the first image 920 and the second image 821 captured with the exposure value increased or decreased with respect to the first image 720.

According to various embodiments, the user interface 910 of the electronic device 201 may include exposure value information about the HDR image 925 displayed in the second preview image. For example, the electronic device 201 may display the HDR image 925 obtained using the second image 921 having an exposure value of "+1" as the second preview image. In this case, the electronic device 201 may include information indicating "1" on the user interface 910.

According to various embodiments, the electronic device 201 may identify a user input to the user interface 910. For example, the user input may include an input for changing the exposure value through the user interface 910 (e.g., a touch input to the user interface 910 or an input to a physical key included in the electronic device 201).

Referring to FIG. 9B, according to various embodiments, when the exposure value is changed based on a user input, the electronic device 201 may display a user interface 930 based on the changed exposure value. In this case, the electronic device 201 may display the first preview image and the second preview image reflecting the changed exposure value. For example, the first preview image may include a first image 940 captured with a default exposure value. For example, the first preview image may include the first image 940 captured at the same exposure value as the first image 920 of FIG. 9A. For example, the second preview image may include an HDR image 945 obtained using the first image 940 and the second image 941 captured with the exposure value increased or decreased with respect to the first image 940.

According to various embodiments, the user interface 730 of the electronic device 201 may include exposure value information about the HDR image 945 displayed in the second preview image. For example, the electronic device 201 may display the HDR image 945 obtained using the second image 741 having an exposure value of "+2" as the second preview image. In this case, the electronic device 201 may include information indicating "2" on the user interface 730. For example, the HDR image 945 having an exposure value of "+2" may be represented at a clearer brightness difference than the HDR image 925 having an exposure value of "+1."

Accordingly, the electronic device 201 may display an HDR image changed according to a change in the exposure value, through the preview image in advance. Further, the electronic device 201 may change the exposure value in real-time according to a user input to the user interface, obtaining or capturing an HDR image reflecting the user's desired degree of exposure through the preview image.

Figure 10:
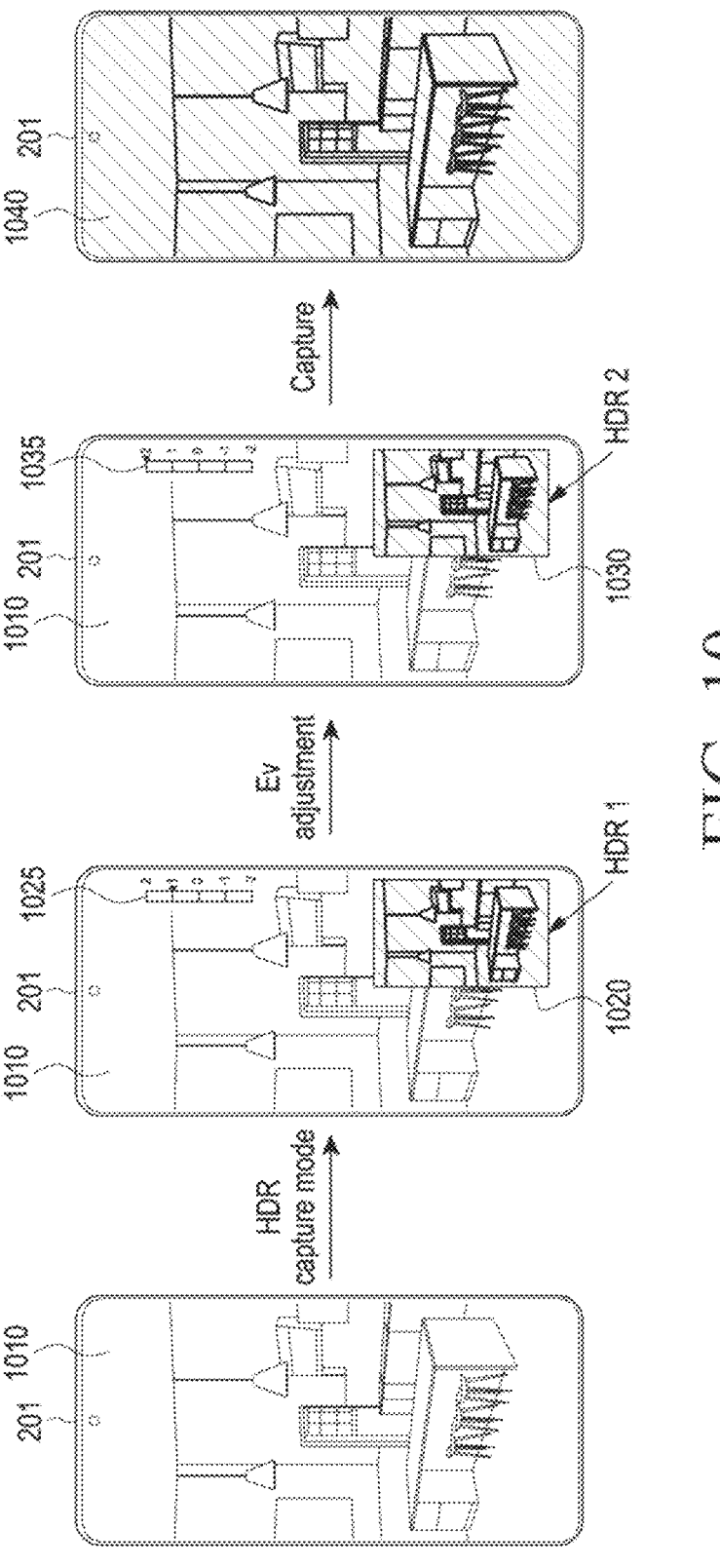
FIG. 10 is a view illustrating an operation in which an electronic device displays a first preview image and a second preview image and captures an image according to one or more embodiments.

FIG. 10 is a view illustrating an operation in which an electronic device displays a first preview image and a second preview image and captures an image according to various embodiments.

Referring to FIG. 10, according to various embodiments, the electronic device 201 may display, on a display (e.g., the display 260 of FIG. 2), a first preview image 1010 based on images captured at a default exposure value through a camera module (e.g., the camera module 240 of FIG. 2).

According to various embodiments, upon identifying a request (e.g., a user input) for switching the capture mode to the HDR capture mode, the electronic device 201 may increase and/or decrease the exposure value with respect to the default exposure value to obtain the first HDR images using the captured images. Further, the electronic device 201 may display the second preview image 1020 together with the first preview image 1010 based on the first HDR images. For example, the electronic device 201 may display the first preview image 1010 and the second preview image 1020 with the second preview image 1020 overlapping the first preview image 1010. For example, the electronic device 201 may display the first preview image 1010 and the second preview image 1020 in a PIP manner. In this case, the electronic device 201 may display a user interface 1025 for changing the exposure value of the second preview image on the first preview image 1010.

According to various embodiments, when a user input for capturing an HDR image is identified while the first preview image 1010 and the second preview image 1020 are displayed, the electronic device 201 may obtain (or capture) an HDR image using the camera module 240. For example, the captured HDR image may be an image corresponding to the first HDR image 1020.

According to various embodiments, the electronic device 201 may identify a user input to the user interface 1025 for adjusting the exposure value (e.g., an EV value) of the second preview image 1020.

According to various embodiments, when a user input to the user interface 1025 to adjust the exposure value of the second preview image 1020 is identified, the electronic device 201 may obtain a second HDR image using images captured with the exposure value increased and/or decreased with respect to the exposure value of the first HDR image. Further, the electronic device 201 may display the second preview image 1030 together with the first preview image 1010 based on the second HDR images. For example, the electronic device 201 may display the first preview image 1010 and the second preview image 1030 with the second preview image 1020 overlapping the first preview image 1010. For example, the electronic device 201 may display the first preview image 1010 and the second preview image 1030 in a PIP manner. In this case, the electronic device 201 may display a user interface 1035 for changing the exposure value of the second preview image 1030 on the first preview image 1010.

According to various embodiments, when a user input for capturing an HDR image is identified while the first preview image 1010 and the second preview image 1030 are displayed, the electronic device 201 may obtain (or capture) an HDR image using the camera module 240. For example, the captured HDR image may be an image corresponding to the second HDR image 1030.

According to various embodiments, an electronic device 201 may comprise a camera module 240, a display 250, and a processor 220 configured to obtain a first image and at least one image in which a parameter for a high dynamic range (HDR) is changed with respect to the first image, through the camera module, obtain a first HDR image using the first image and the at least one image, display, on the display, a first preview image corresponding to the first image together with a second preview image corresponding to the first HDR image, display, on the display, a user interface for changing the parameter for the first HDR image, and if the parameter is changed based on a user input to the user interface, display the second preview image corresponding to a second HDR image based on the changed parameter.

According to various embodiments, the processor may be configured to display the first preview image and the second preview image with the first preview image and the second preview image overlapping each other.

According to various embodiments, the processor may be configured to display the second preview image in a smaller size than the first preview image.

According to various embodiments, the processor may be configured to obtain an image corresponding to the first image through a first camera included in the camera module and obtain the first image and the at least one image through a second camera included in the camera module.

According to various embodiments, the processor may be configured to obtain the image corresponding to the first image in a first time period through the first camera and obtain the first image in the first time period and the at least one image in a second time period different from the first time period, through the second camera.

According to various embodiments, the processor may be configured to obtain the first image in a first time period and the at least one image in a second time period different from the first time period, through any one camera included in the camera module.

According to various embodiments, the processor may be configured to resize the first image and the at least one image obtained through the any one camera and obtain the first HDR image using the resized first image and at least one image.

According to various embodiments, the processor may be configured to obtain the first HDR image using at least two of the first image, a second image whose exposure degree is increased by a first exposure value with respect to the first image, and a third image whose exposure degree is decreased by the first exposure value with respect to the first image.

According to various embodiments, the processor may be configured to, if the exposure value is changed into a second exposure value by the user input, obtain the second HDR image using at least two of the first image, a second image whose exposure degree is increased by the second exposure value with respect to the first image, and a third image whose exposure degree is decreased by the second exposure value with respect to the first image.

According to various embodiments, the processor may be configured to capture an image based on the second preview image through the camera module, based on a user input requesting to capture an HDR image.

According to various embodiments, a method for operating an electronic device 201 may comprise obtaining a first image and at least one image in which a parameter for a high dynamic range (HDR) is changed with respect to the first image, through a camera module 240 included in the electronic device, obtaining a first HDR image using the first image and the at least one image, displaying, on a display 260 included in the electronic device, a first preview image corresponding to the first image together with a second preview image corresponding to the first HDR image, displaying, on the display, a user interface for changing the parameter for the first HDR image, and if the parameter is changed based on a user input to the user interface, displaying the second preview image corresponding to a second HDR image based on the changed parameter.

According to various embodiments, displaying the first preview image and the second preview image may include displaying the first preview image and the second preview image with the first preview image and the second preview image overlapping each other.

According to various embodiments, displaying the first preview image and the second preview image may include displaying the second preview image in a smaller size than the first preview image.

According to various embodiments, obtaining the first image and the at least one image may include
obtaining an image corresponding to the first image through a first camera included in the camera module and obtaining the first image and the at least one image through a second camera included in the camera module.

According to various embodiments, obtaining the first image and the at least one image may include obtaining the image corresponding to the first image in a first time period through the first camera and obtaining the first image in the first time period and the at least one image in a second time period different from the first time period, through the second camera.

According to various embodiments, obtaining the first image and the at least one image may include obtaining the first image in a first time period and the at least one image in a second time period different from the first time period, through any one camera included in the camera module.

According to various embodiments, obtaining the first HDR image may include resizing the first image and the at least one image obtained through the any one camera and obtaining the first HDR image using the resized first image and at least one image.

According to various embodiments, obtaining the first HDR image may include obtaining the first HDR image using at least two of the first image, a second image whose exposure degree is increased by a first exposure value with respect to the first image, and a third image whose exposure degree is decreased by the first exposure value with respect to the first image.

According to various embodiments, obtaining the second HDR image may include, if the exposure value is changed into a second exposure value by the user input, obtaining the second HDR image using at least two of the first image, a second image whose exposure degree is increased by the second exposure value with respect to the first image, and a third image whose exposure degree is decreased by the second exposure value with respect to the first image.

According to various embodiments, a non-transitory recording medium may store a program capable of performing the operations of obtaining a first image and at least one image in which a parameter for a high dynamic range (HDR) is changed with respect to the first image, through a camera module 240 included in an electronic device 201, obtaining a first HDR image using the first image and the at least one image, displaying, on a display 260 included in the electronic device, a first preview image corresponding to the first image together with a second preview image corresponding to the first HDR image, displaying, on the display, a user interface for changing the parameter for the first HDR image, and if the parameter is changed based on a user input to the user interface, displaying the second preview image corresponding to a second HDR image based on the changed parameter.

What is claimed is:

1. An electronic device, comprising:

a camera apparatus;

a display;

at least one processor; and memory storing instructions, that, when executed by the at least one processor, cause the electronic device to:

obtain, through the camera apparatus, a first image and at least one image in which a parameter for a high dynamic range (HDR) is changed with respect to the first image;

obtain a first HDR image using the first image and the at least one image;

display, on the display, a first preview image corresponding to the first image and a second preview image corresponding to the first HDR image;

while displaying the first preview image and the second preview image, display, on the display, a user interface for changing at least one of an exposure value, white balance, shutter speed, or ISO sensitivity of the first HDR image; and based on identifying a user input to the user interface while the first preview image and the second preview image are being displayed, display the second preview image, which is generated based on the at least one of the exposure value, white balance, shutter speed, or ISO sensitivity changed by the user input, as the second preview image in place of the first preview image.

2. The electronic device of claim 1, wherein the instructions, when executed by the at least one processor, cause the electronic device to display the first preview image and the second preview image overlapping.

3. The electronic device of claim 2, wherein the instructions, when executed by the at least one processor, cause the electronic device to display the second preview image in a smaller size than the first preview image.

4. The electronic device of claim 1, wherein the instructions, when executed by the at least one processor, cause the electronic device to:

obtain an image corresponding to the first image through a first camera included in the camera apparatus; and obtain the first image and the at least one image through a second camera included in the camera apparatus.

5. The electronic device of claim 4, wherein the instructions, when executed by the at least one processor, cause the electronic device to:

obtain the image corresponding to the first image in a first time period through the first camera; and obtain the first image in the first time period and the at least one image in a second time period different from the first time period, through the second camera.

6. The electronic device of claim 1, wherein the instructions, when executed by the at least one processor, cause the electronic device to obtain the first image in a first time period and the at least one image in a second time period different from the first time period, through any camera included in the camera apparatus.

7. The electronic device of claim 6, wherein the instructions, when executed by the at least one processor, cause the electronic device to:

resize the first image and the at least one image obtained through the any camera; and obtain the first HDR image using the resized first image and the resized at least one image.

8. The electronic device of claim 1, wherein the instructions, when executed by the at least one processor, cause the electronic device to obtain the first HDR image using at least two of the first image, a second image in which an exposure degree is increased by a second exposure value with respect to the first image, and a third image in which the exposure degree is decreased by the second exposure value with respect to the first image.

9. The electronic device of claim 8, wherein the instructions, when executed by the at least one processor, cause the electronic device to, based on the exposure degree being changed into a third exposure value in response to the user input, obtain the second image using at least two of the first image, a fourth image in which the exposure degree is increased by the third exposure value with respect to the first image, and a fifth image in which the exposure degree is decreased by the third exposure value with respect to the first image.

10. The electronic device of claim 1, wherein the instructions, when executed by the at least one processor, cause the electronic device to capture an image based on the second preview image through the camera apparatus, based on a user input requesting to capture an HDR image.

11. A method for operating an electronic device, the method comprising:

obtaining, through a camera apparatus included in the electronic device, a first image and at least one image in which a parameter for a high dynamic range (HDR) is changed with respect to the first image;

obtaining a first HDR image using the first image and the at least one image;

displaying, on a display included in the electronic device, a first preview image corresponding to the first image and a second preview image corresponding to the first HDR image;

while displaying the first preview image and the second preview image, displaying, on the display, a user interface for changing at least one of an exposure value, white balance, shutter speed, or ISO sensitivity of the first HDR image; and based on identifying a user input to the user interface while the first preview image and the second preview image are being displayed, displaying the second preview image, which is generated based on the at least one of an exposure value, white balance, shutter speed, or ISO sensitivity changed by the user input, as the second preview image in place of the first preview image.

12. The method of claim 11, wherein displaying the first preview image and the second preview image includes displaying the first preview image and the second preview image overlapping.

13. The method of claim 11, wherein displaying the first preview image and the second preview image includes displaying the second preview image in a smaller size than the first preview image.

14. The method of claim 11, wherein obtaining the first image and the at least one image includes:

obtaining an image corresponding to the first image through a first camera included in the camera apparatus; and obtaining the first image and the at least one image through a second camera included in the camera apparatus.

15. The method of claim 14, wherein obtaining the first image and the at least one image includes:

obtaining the image corresponding to the first image in a first time period through the first camera; and obtaining the first image in the first time period and the at least one image in a second time period different from the first time period, through the second camera.

* * * * *